United States Patent [19]
Vaughan

[11] 3,923,966
[45] Dec. 2, 1975

[54] DIRECT MANUFACTURE OF HYDROGEN PEROXIDE FROM HYDROGEN SULFIDE

[75] Inventor: Lawrence G. Vaughan, Wilmington, Del.

[73] Assignee: E. I. Du Pont de Nemours & Co., Wilmington, Del.

[22] Filed: Nov. 21, 1973

[21] Appl. No.: 417,805

[52] U.S. Cl................................ 423/573; 423/588
[51] Int. Cl.² ................... C01B 17/02; C01B 15/02
[58] Field of Search ........... 423/570, 579, 590, 573, 423/588, 589, 226; 260/369

[56] References Cited
UNITED STATES PATENTS

| | | | |
|---|---|---|---|
| 2,657,119 | 10/1953 | Patton | 423/569 |
| 2,772,146 | 11/1956 | Pippig | 423/573 |
| 2,819,950 | 1/1958 | Patton | 423/573 |
| 2,997,439 | 8/1961 | Nicklin et al. | 423/573 |
| 3,098,714 | 7/1963 | Kabisch et al. | 260/369 X |
| 3,307,909 | 3/1967 | Reilly | 260/369 X |
| 3,311,453 | 3/1967 | Lusby | 423/579 |

*Primary Examiner*—Oscar R. Vertiz
*Assistant Examiner*—Wayne A. Langel

[57] ABSTRACT

Hydrogen sulfide is reacted with an anthraquinone in an organic solvent and in the presence of an amine catalyst; the elemental sulfur thus produced is separated from the resulting anthrahydroquinone which is oxidized to yield hydrogen peroxide and the starting anthraquinone.

10 Claims, No Drawings

DIRECT MANUFACTURE OF HYDROGEN PEROXIDE FROM HYDROGEN SULFIDE

BACKGROUND OF THE INVENTION

Hydrogen sulfide is produced extensively as a by-product from natural gas and petroleum and is an obnoxious pollutant. Hydrogen peroxide, on the other hand, is known as an anti-pollutant, particularly when used in the treatment of sewage and wastes. The conversion of hydrogen sulfide to an inexpensive product for eliminating pollution, like hydrogen peroxide, would be highly desirable.

A process for making such a conversion has been disclosed in U.S. Pat. No. 3,311,453 issued to George Russell Lusby on Mar. 28, 1967. In that process, hydrogen sulfide gas is reacted with an aqueous alkaline solution of a salt of an anthraquinone disulfonic acid to produce elemental sulfur and the reduced anthraquinone disulfonic acid salt. The sulfur is separated and the reduced salt is regenerated by adding lime to it and aerating the solution. The precipitate of calcium peroxide thus obtained is separated by filtration and the hydrogen peroxide recovered by decomposition of calcium peroxide with carbon dioxide.

One of the major difficulties with such a process is the fact that the anthraquinone disulfonic acid salt cannot be separated satisfactorily from the fine-grained precipitated calcium peroxide. As a result, the calcium peroxide usually contains several percent of the anthraquinone disulfonic acid salt which cannot be removed, even by the use of uneconomically large amounts of wash water. Thus a hydrogen peroxide product contaminated with adsorbed anthraquinone disulfonic acid salt is obtained. Further, the quantity of the salt lost with each cycle makes a continuous operation economically unfeasible. While it has been proposed that this problem be overcome by precipitating calcium peroxide in the form of coarse crystals of calcium peroxide octahydrate, the fact nevertheless remains that the process is cumbersome and does not provide a direct economical route to hydrogen peroxide from hydrogen sulfide.

SUMMARY OF THE INVENTION

It has now been found that hydrogen peroxide can be produced directly from hydrogen sulfide by reacting hydrogen sulfide with an anthraquinone in an organic solvent and in the presence of an amine catalyst, separating the elemental sulfur thus produced, oxidizing the anthrahydroquinone to form hydrogen peroxide, regenerating the anthraquinone and extracting the hydrogen peroxide with water.

Thus, the instant process is simple and direct, differing from known methods for producing hydrogen peroxide in that hydrogen sulfide is used to reduce the anthraquinone instead of hydrogen. As a consequence, it is not necessary to use a noble metal catalyst and the reduction progresses efficiently in organic solvent solution using an amine catalyst. The starting quinone is a neutral anthraquinone, soluble in organic solvents, and need not contain substituents such as acid or salt groups. Thus, the process of the invention represents a new direct route to hydrogen peroxide from hydrogen sulfide and a practical method for hydrogen sulfide abatement.

DETAILED DESCRIPTION OF THE INVENTION

Any of the alkylated anthraquinones and organic solvents conventionally employed in the preparation of hydrogen peroxide can be used in the process of this invention including any of those listed in U.S. Pat. Nos. 3,328,128 issued to Kabish on June 27, 1967; 3,038,786 issued to Hiratsuka et al. on June 12, 1962; 2,537,655 issued to Dawsey et al. on Jan. 9, 1951; 2,668,753 issued to Harris et al. on Feb. 9, 1954; 2,215,883 issued to Riedl et al. on Sept. 24, 1940; 2,689,169 issued to Hinegardner on Sept. 14, 1954 and the like. Tetrahydroalkyl anthraquinones such as tetrahydro-2-ethyl anthraquinone, tetrahydro-2-amyl anthraquinone and tetrahydro-2-tert butyl anthraquinone are preferred starting tetrahydroanthraquinones and 2-ethyl-, 2-tert butyl- and 2-amyl anthraquinones are preferred starting anthraquinones. Diisobutyl carbinol, mono or dimethyl naphthalene, Hi-Sol or in other words, alkylbenzene derivatives as described in U.S. Pat. No. 3,699,217 issued to Schreyer, et al. on Oct. 17, 1972 or mixtures thereof are preferred organic solvents.

A catalytic amount of any base which is soluble at a concentration of at least 0.5% by weight in the solvent used in the preparation of the hydrogen peroxide and which does not decompose peroxide may be employed as the catalyst since the reaction is base catalyzed. The hydroxides of the metals of Groups I and II of the Periodic Chart are suitable although the alkali metal (e.g., lithium, sodium, potassium) hydroxides are preferred. It is particularly preferred to employ a base that is oil-soluble or organic solvent-soluble and, of these, the most preferred catalysts are amines. The concentration of catalyst can vary from 0.5 to 35 percent by weight of the working solution, preferably 0.5 to 10 percent. Tertiary amine catalysts are particularly preferred, especially those having from 1 to 20 carbon atoms in the substituent groups which may be linear, branched or cyclic. Examples are triisopentylamine, diisopropylethylamine, trioctylamine, N,N-diethylcyclohexylamine, tribenzylamine, tributylamine, tripropylamine, N,N-dimethyl-t-butylamine, 1,4-dimethylpiperazine, tridodecylamine, quinuclidine, 1,8-bis-(dimethylamino)-naphthalene, N-ethyldibenzylamine, 1,4-diazobicyclo[2.2.2]octane, 1,5-diazobicyclo[4.3.0]-non-5-ene, 1,5-diazobicyclo[5.4.0]undec-5-ene and the like, although ammonia, 2,2,6,6-tetramethylpiperidine, 1-amino adamantane and the like are also operable. Tertiary amines are preferred, particularly diamines in which each of the amino groups contains a tertiary nitrogen atom, since secondary and primary amines are more easily degraded by oxygen and $H_2O_2$. Tertiary amines are also generally more soluble in organic solvents but less soluble in water than primary or secondary amines.

The anthraquinone is reduced with hydrogen sulfide in an organic solvent solution in the presence of a base catalyst which does not decompose hydrogen peroxide at any suitable temperature and pressure. Preferably, however, a temperature of from about 10°C. to about 200°C. and a pressure of from about one to about ten atmospheres are employed in carrying out the reaction.

The elemental sulfur produced as a result of hydrogen sulfide reduction of the anthraquinone can be removed from the reduced anthraquinone solution by any convenient method. For example, the reduced working solution can be filtered to remove precipitated sulfur and degassed under vacuum to remove any excess hydrogen sulfide which may be contained therein. Centrifugation may also be employed. Oxidation of the remaining anthrahydroquinone is then carried out by any of the conventional methods set forth in the patents cited above to yield the starting anthraquinone and hydrogen peroxide.

The hydrogen peroxide is recovered by any conventional method as outlined in the patents cited hereinabove such as, for example, by extraction with water. High yields of hydrogen peroxide are possible.

The process of this invention presents enormous commercial advantages. The hydrogen peroxide produced is of equal quality with conventional hydrogen peroxide. The cost of producing hydrogen peroxide is decreased since the hydrogen source is less expensive and freely available wherever refineries and natural gas purification plants are located. Because of the mild hydrogenation conditions, quinone degradation is reduced. The product sulfur can be easily removed and, hence, does not foul the process equipment. No noble metal catalyst is required to carry out the process and the catalyst which is used does not get into the product or present a pollution problem. In addition, the process of this invention would be an adequate substitute for a Claus unit for the conversion of hydrogen sulfide to sulfur.

The invention is further illustrated but is not intended to be limited by the following examples in which all parts, percentages and ratios are by weight unless otherwise specified.

EXAMPLE 1

A sample of 0.513 gram of tetrahydrobutyl anthraquinone ($1.91 \times 10^{-3}$ mol) was dissolved in 10 ml. of a 60/40 (by volume) mixture of Hi-Sol and diisobutylcarbinol. The solution was then saturated with $H_2S$ at room temperature and absorbed 67.0 cc. over a 15 minute period. The gas burette was then refilled and a total of 0.0345 gram of triisopentylamine catalyst ($1.52 \times 10^{-4}$ mol) in 2.0 ml. benzene added in three portions over the next 1 ½ hours. The solution absorbed an additional 41.0 ml. $H_2S$ (including approximately 14 ml. absorbed by the added benzene) over a 95 minute period. The solution turned from an initial light yellow color to dark brown during this period. The reaction was continued overnight and the next morning a total of 81.5 cc. of $H_2S$ had been absorbed by the solution (46.7 cc. theoretical required for quinone present). The solution color had changed to light yellow and was hazy due to the presence of colloidal sulfur. The solution was then filtered through a sintered glass filter to remove the sulfur and a vacuum was used to strip off excess $H_2S$ dissolved in the solution. It was then poured into 100 cc. of water for oxidation and extraction, and the flask was rinsed twice with 10 ml. portions of ether. Oxidation was carried out using pure oxygen. After separation of the aqueous layer containing the peroxide, the organic layer was extracted twice more with 100 ml. of water. Titration gave a 92.25% yield of $H_2O_2$ based on available quinone in the working solution.

EXAMPLE 2

A sample of 0.602 gram of tetrahydrobutyl anthraquinone ($2.24 \times 10^{-3}$ mol) was dissolved in 10 ml. of a 60/40 (by volume) mixture of Hi-Sol and diisobutylcarbinol. The solution was then saturated with $H_2S$ and absorbed 73 cc. in a two-minute period. One gram (7.75 $\times 10^{-3}$ mol) of diisopropylethylamine catalyst was then dissolved in another 10 ml. of the Hi-Sol/diisobutylcarbinol solvent and the catalyst solution was also saturated with $H_2S$. The solution absorbed 83 cc. in the first two minutes and only 6 cc. during the next 42 minutes. A 1.0 ml. sample of this saturated catalyst solution was then added to the quinone solution. Absorption of additional $H_2S$ started within two minutes and the theoretical quantity (54.8 cc.) was absorbed in 20 minutes. The reduced solution was then filtered to remove the elemental sulfur and excess $H_2S$ was removed under vacuum. After oxidation, a 63.8 percent yield of $H_2O_2$ was obtained upon extraction of the peroxide with water.

EXAMPLE 3

A 0.51 gram (1.90 mmols) sample of tetrahydrobutyl anthraquinone was dissolved in 10 ml. of a 60/40 (by volume) mixture of Hi-Sol/diisobutylcarbinol. The stirred solution was connected to a gas burette containing $H_2S$ and 0.5 gram (3.27 mmols) of N-cyclohexylpiperidine was added as catalyst. When the uptake of gas stopped, excess $H_2S$ was removed by pulling a vacuum on the flask for several minutes. The solution was then oxidized with air, and $H_2O_2$ was extracted with water. The yield, based on available anthraquinone, was 18.75 percent.

EXAMPLE 4

A working solution was prepared which contained 0.52 gram of tetrahydrobutyl anthraquinone (1.94 mmols) and 0.02 gram (0.13 mmols) of N-cyclohexylpiperidine in 11 ml. of a 60/40 (by volume) solution of Hi-Sol/diisobutylcarbinol. The solution was connected to a gas burette filled with $H_2S$ and stirred until uptake of $H_2S$ ceased. Excess $H_2S$ was then removed by vacuum. After oxidation of the working solution with oxygen, $H_2O_2$ was extracted with water. The yield was 55.8 percent, based on available anthraquinone.

EXAMPLE 5

A sample of 0.803 gram of tetrahydrobutyl anthraquinone (3.00 mmols) and 0.1525 gram (0.531 mmol) of tribenzylamine catalyst were dissolved in 10 ml. of a 60/40 (by volume) mixture of Hi-Sol and diisobutylcarbinol. The solution was allowed to absorb 94.0 cc. of $H_2S$ overnight. It was then filtered to remove colloidal sulfur and excess $H_2S$ was stripped off under vacuum. A 34.2 percent yield of $H_2O_2$ was obtained after oxidation of the working solution with oxygen and extraction of the peroxide with water.

EXAMPLE 6

A solution of 10.0 grams of tetrahydrobutyl anthraquinone (37.32 mmols) and 4.0 grams (11.34 mmols) of trioctylamine catalyst in 190 parts of a 60/40 (by volume) mixture of Hi-Sol and diisobutylcarbinol was added to a glass reactor vessel containing inlet tubes for introducing $H_2S$ and air, a thermometer, a reflux condenser, a stirrer, and a stopcock on the bottom for withdrawing liquid. The Hi-Sol used in this and the other examples which use Hi-Sol herein is a mixture of alkylbenzene derivatives of which about 90 percent contain $C_3$ to $C_5$ alkyl groups. The mixture has a boiling point above 170°C., generally 180°C. to 230°C.

After the introduction of a measured quantity of $H_2S$, the solution was stirred for varying time intervals. After oxidation of the reduced working solution with air, the peroxide formed was extracted with two 50 ml. portions of water. The aqueous layer was withdrawn through the stopcock on the bottom, leaving the organic working solution in the reaction vessel for the next run. No sulfur was filtered off between runs. Operating conditions and results are shown in the following table. All operations were conducted at 25°C. except cycle 6 which was conducted at 65°C.

Cyclic Production of Hydrogen Peroxide from Hydrogen Sulfide

| Cycle No. | % Reduction | Reduction Time | $H_2O_2$ Yield (%) |
|---|---|---|---|
| 1 | 53.0 | 18 hrs. | 27.2 |
| 2 | 66.0 | 5 hrs. | 14.6 |
| 3 | 68.0 | 16 hrs. | 41.3 |
| 4 | 59.0 | 10 min. | 8.7 |
| 5 | 70.0 | 88 hrs. | 34.2 |
| 6 | 58.0 | 10 min. | 3.1 |

EXAMPLE 7

About 0.50 gram of tetrahydroethylanthraquinone (2.08 mmols) and 0.30 gram (2.13 mmols) of 2,2,6,6-tetramethylpiperidine were dissolved in 10 ml. of a 60/40 (by volume) mixture of p-xylene and diisobutylcarbinol. The solution was connected to gas burette and $H_2S$ was introduced with stirring for 4 hours until uptake of $H_2S$ ceased. Excess $H_2S$ was then removed under vacuum. The solution was filtered and 20 ml. of water were added. The solution was oxidized with air for 30 minutes. After separation of the aqueous layer, the organic layer was extracted a second time with 20 ml. of water. The yield of peroxide extracted in the aqueous layer, based on available anthraquinone, was 63.9 percent.

EXAMPLE 8

About 25.0 grams of ethylanthraquinone (0.11 mol) and 1.4 grams (0.082 mol) of ammonia were dissolved in 275 ml. of a 60/40 (by volume) mixture of Hi-Sol/-diisobutylcarbinol. A total of 1025 cc. of $H_2S$ was then added to the stirred solution. Stirring was continued for 17 hours during which precipitation of sulfur occurred. After the addition of 50 ml. of water, the solution was oxidized with air. The aqueous layer was separated and the organic layer extracted a second time with 50 ml. of water. The yield of peroxide in the aqueous extracts, based on $H_2S$ added was 26.8 percent.

The organic working solution was then reduced a second time, using 1.4 grams ammonia as catalyst and 595 cc. $H_2S$. After being stirred for 24 hours, the solution was oxidized with air and yielded 10.5% of $H_2O_2$.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as set forth in the claims.

What is claimed is:

1. In a method for preparing hydrogen peroxide by reducing and oxidizing an alkyl anthraquinone, or a tetrahydroalkyl anthraquinone, the improvement which comprises reducing said anthraquinone with hydrogen sulfide in an organic solvent solution in the presence of a concentration of from 0.5 to 35 percent by weight of the working solution of an organic base catalyst soluble in the organic solvent which does not decompose hydrogen peroxide, separating the elemental sulfur thus formed, oxidizing the resulting anthrahydroquinone and extracting the hydrogen peroxide with water.

2. The improvement of claim 1 wherein the catalyst is an amine.

3. The improvement of claim 2 wherein the catalyst is a tertiary amine, the substituent groups of which contain from 1 to 20 carbon atoms.

4. The improvement of claim 3 wherein the catalyst is a diamine in which each of the amino groups contains a tertiary nitrogen atom.

5. The improvement of claim 2 wherein the amine concentration is 0.5 to 10 percent by weight.

6. The improvement of claim 1 wherein the organic solvent is diisobutyl carbinol, mono or dimethyl naphthalene, xylene, Hi-Sol or mixtures thereof.

7. The improvement of claim 1 wherein the anthraquinone is tetrahydro-2-ethyl, tetrahydro-2-butyl- or tetrahydro-2-amyl anthraquinone.

8. The improvement of claim 1 wherein the anthraquinone is 2-ethyl-, 2-tert-butyl or 2-amyl anthraquinone.

9. The improvement of claim 1 wherein the temperature is from 10° to 200°C.

10. The improvement of claim 1 wherein the pressure is from 1 to 10 atmospheres.

* * * * *

UNITED STATES PATENT OFFICE
CERTIFICATE OF CORRECTION

PATENT NO. : 3,923,966
DATED : DECEMBER 2, 1975
INVENTOR(S) : LAWRENCE G. VAUGHAN

It is certified that error appears in the above-identified patent and that said Letters Patent are hereby corrected as shown below:

Column 6, line 31, "The improvement of claim 3" should be -- The improvement of claim 2 --.

Signed and Sealed this thirtieth Day of March 1976

[SEAL]

Attest:

RUTH C. MASON
*Attesting Officer*

C. MARSHALL DANN
*Commissioner of Patents and Trademarks*